3,487,228
POWER GENERATING SYSTEM
Bernard Kriegel, Los Angeles, Calif., assignor of one-tenth each to Jean K. Lamphere and Archer W. Kammerer, Jr., and three-tenths to Archer W. Kammerer, all of Fullerton, Calif.
Filed Apr. 17, 1967, Ser. No. 631,519
Int. Cl. H02p 9/04, H02k 7/18
U.S. Cl. 290—52                                   11 Claims

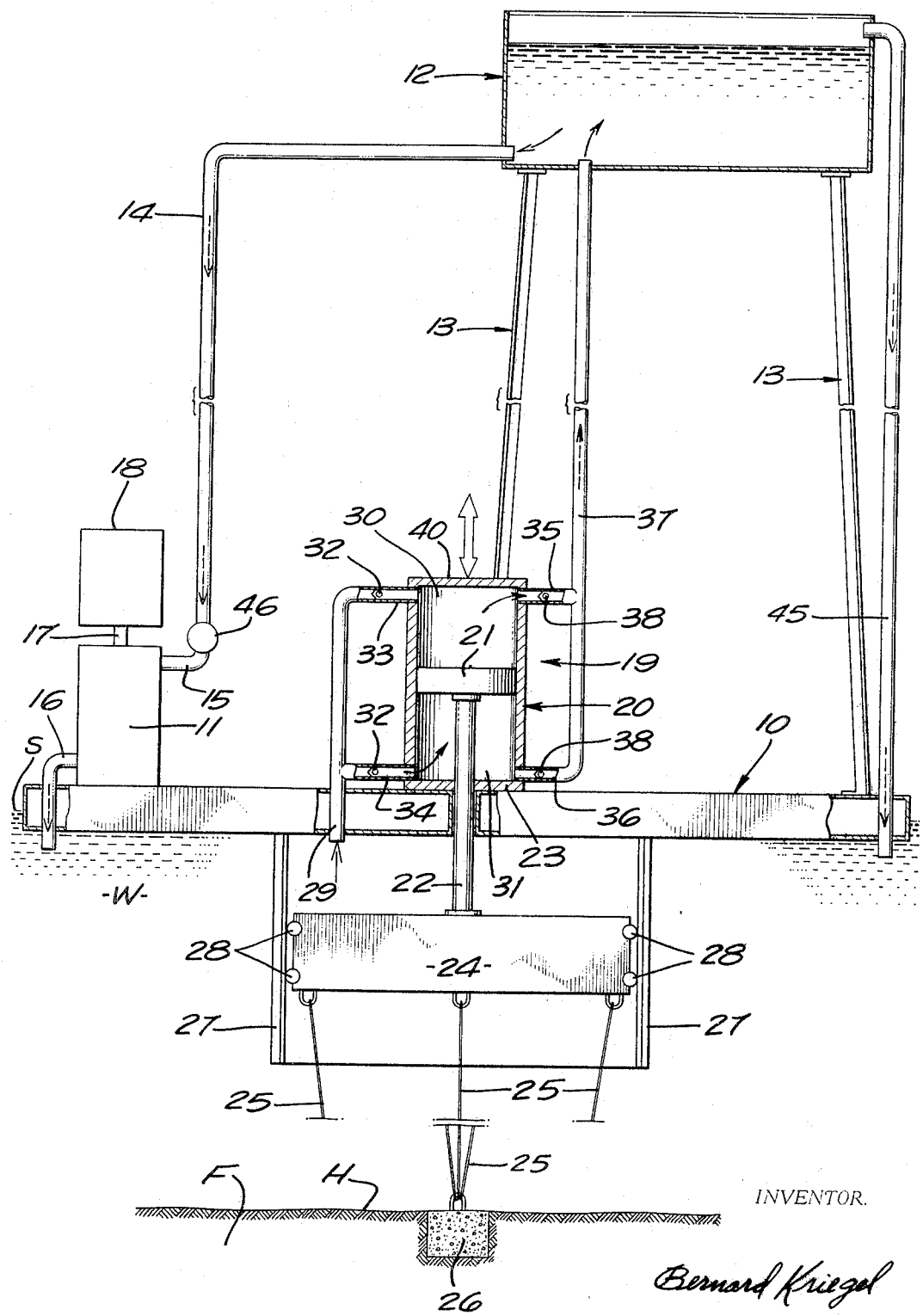

ABSTRACT OF THE DISCLOSURE

Power generating system in which vertical motion of an offshore floating oil well drilling vessel, or other floating device, operates one or more pumps that elevate water to an overhead storage reservoir from which a continuous supply of water is directed to a hydraulic turbine therebelow coupled to an electric generator to rotate the same.

---

The present invention relates to power generating systems, and more particularly to the generation of power through utilization of the energy in ocean waves.

Oil, gas, and similar well bores, are drilled in subsea or ocean locations from a vessel or barge floating in the water or from a platform supported from the ocean floor. The power requirements of the equipment mounted on such floating vessels and platforms are comparatively large and require the consumption of large quantities of fuel, which must not only be stored on the vessel or platform, but also transported thereto, all of which is costly.

In general, the invention is directed to a power generating system in which the energy of a vertically moving vessel, such as a drilling vessel, or of a large float used in conjunction with a fixed offshore drilling platform, is employed to pump water to a reservoir of adequate capacity located at a suitable height above the water surface, the water flowing from the reservoir downwardly to and through a suitable hydraulic turbine coupled to an electric generator, or other energy consuming equipment. A control device may be used to maintain the speed of the turbine constant, despite changes in the load or variations in the hydrostatic head of liquid supplied by the reservoir to the turbine. Since drilling vessels or barges often weigh thousands of tons, water at large volumetric rates can be pumped to substantial heights as a result of vertical motion of the vessel or barge incident to the action of the ocean waves, thereby insuring the presence of sufficient water in the reservoir at all times for the continued generation of electric power in relatively large amounts. The power generated by the system decreases that required from the prior sources of energy, considerably reducing the fuel requirements and consumption of such other sources.

This invention possesses many other advantages, and has other purposes which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

The single figure is a diagrammatic representation of a power generating system embodying the invention, parts thereof being disclosed in section.

The form of invention illustrated in the drawings includes a floating vessel, barge, or platform 10 that can be of any suitable type used in the drilling of oil, gas, or sulphur wells at subsea locations. The vessel or barge floats in a body of water W, such as an ocean, the well bore (not shown) being drilled in the underlying formation F. The drilling equipment is not disclosed since it forms no portion of the present invention, which is directed to the generation of electric or other power used for operating the drilling and other equipment located on the floating vessel 10. Such vessels are often of comparatively large size, weighing thousands of tons, and move vertically several feet under the action of waves, which, typically, may average about four to five feet. The floating vessel is appropriately anchored at the location so that its drilling equipment is properly located over the well bore, and will remain in such location. In lieu of anchoring the floating vessel, it may be retained in appropriate position over the well bore by a known power operated propeller mechanism, or the like.

A hydraulic motor or turbine 11, which may be of the vertical type, is suitably supported on the floating vessel or barge, preferably adjacent to the surface S of the water. Water for operating the turbine flows from a reservoir 12 of proper size mounted on the floating vessel at a desired height above the hydraulic turbine, which, for example, may be about 100 feet in vertical height. This reservoir is carried from the floating vessel or barge by a suitable supporting structure 13, the water in the reservoir passing therefrom through an intake line 14 to the hydraulic turbine inlet 15 and then discharging from the turbine through an exhaust line 16, from which the water returns to the ocean W. The hydrostatic head of water rotates the turbine 11, its shaft 17 rotating a suitable load source connected thereto, such as an electric generator 18, which supplies electrical energy to the electric motors, and other power consumers (not shown), on the floating vessel.

The vertical reciprocations of the floating member or vessel 10 are employed for pumping water to the reservoir 12. As disclosed, a pump 19 includes a cylinder 20 suitably affixed to the floating vessel 10, and movable upwardly and downwardly therewith relative to fixed or compratively stationary piston 21 contained therein and secured to a suitable piston rod 22 extending through the lower rod end 23 of the cylinder. The rod is affixed to a submerged captive float 24 of comparatively large mass having comparatively great buoyancy. This float is prevented from moving upwardly by being anchored at the ocean floor or mudline H, as by a plurality of anchor lines 25 secured at desired points to the float which are secured to the ocean floor, as by being attached to a suitable concrete block or mass 26 embedded in the ocean floor and rigidly secured to the formation F. The floating vessel 10 and the captive float 24 are maintained in appropirate relation with respect to one another by vertical guides 27 disposed on the four sides of the captive float, assuming it to be of rectangular horizontal section, the guides being secured to the floating vessel 10 and being engaged by roller devices 28 mounted on the captive float. Thus, the coaxiality between the cylinder 20 and the floating vessel 10, on the one hand, and the piston 21 and piston rod 22, on the other hand, is maintained.

Water from the ocean is drawn through a suction line 29 communicating with the upper or head end 30 of the cylinder and with the lower or rod end 31 of the cylinder. A one-way inlet valve 32 is disposed in both the upper and lower branches 33, 34 of the suction line 29 to permit water to flow upwardly through the line and into the cylinder, but to preclude return or reverse flow of water from the cylinder through the line 29. The water from both the head end and the rod end of the cylinder is forced through the upper and lower branches 35, 36 of a pump discharge line 37 that extends upwardly to the reservoir 12. Thus, the liquid in the head end 30 of the cylinder passes through a one-way discharge valve 38 in the upper branch 35 into the pump discharge line 37, and from the lower end 31 of the cylinder through a one-way discharge valve 38 into the pump discharge line 37, the two valves permitting liquid to flow in only one direction therethrough; that is, they permit fluid to flow from the cylinder 20 into the discharge line 37, but prevent reverse flow of fluid back to the cylinder.

In the operation of the system disclosed, the floating vessel or platform 10 will move up and down relative to the captive or stationary float 24 and the piston rod 22 and piston 21 several times a minute under the action of the ocean waves. When moving in an upward direction, the cylinder 20 is carried upwardly along the piston 21, the water in the lower end 31 of the cylinder below the piston being forced outwardly through the lower discharge valve 38 into the discharge line 37 and upwardly into the reservoir 12. At the same time, and since the head end 40 of the cylinder is moving upwardly away from the piston 21, a suction is created in the upper part of the cylinder, which will draw water from the ocean through the suction line 29 and past the upper inlet valve 32 into the cylinder.

When the floating vessel or barge 10 descends, it carries the cylinder 20 downwardly with it, shifting the head end 40 of the cylinder toward the piston 21, which will force the water in the cylinder above the piston outwardly through the upper discharge valve 38 into the discharge line 37, and upwardly therethrough into the reservoir 12. During such descent, the rod end 23 of the cylinder is moving downwardly away from the piston, creating a suction in the lower portion 31 of the cylinder that will draw water through the suction line 29 and the lower inlet valve 32 into the cylinder.

The foregoing cycle of operation is repeated, with water successively being drawn into the upper end of the cylinder and outwardly from the lower end of the cylinder to the reservoir, and then into the lower end of the cylinder and outwardly from the upper end of the cylinder to the discharge line 37. In a typical situation, the floating vessel 10 will partake of about four or five complete cycles of up and down movement per minute, and will, therefore, discharge water from the double acting cylinder 20 through the discharge line into the reservoir eight to ten times a minute. Since the reservoir height above the pump 19 is not too great, the cylinder 20 can be made of a large diameter. It is also of appropriate height to insure against engagement of the piston 21 by the head end 40 and the rod end 23 of the cylinder during the maximum stroke of the floating vessel or barge 10 relative to the captive float 24 and piston rod 22 and piston 21 secured thereto. In fact, in lieu of a single set of a cylinder, piston and piston rod being associated with the captive float, a plurality of cylinders, pistons and piston rods can be employed, which will greatly increase the volume of water pumped through the discharge line or lines 37 to the reservoir 12, which is supported at a substantial height above the level of the hydraulic turbine 11, which, as has been stated above, is preferably mounted on the floating vessel adjacent to the surface S of the water.

An overflow pipe or spillway 45 extends from the upper end of the reservoir 12 down to the ocean W to prevent the water in the reservoir from overflowing its upper end.

For the purpose of insuring a constant speed of the hydraulic turbine, a suitable speed regulator or governor 46, which can be of any known type, is disposed in the intake line 14 near the hydraulic turbine, and is appropriately operated from the turbine shaft 17. This speed regulator will vary the rate of flow of water reaching the turbine inlet 15, to compensate for variations in load imposed on the hydraulic turbine and for variations in the hydrostatic head of fluid in the reservoir 12 and in the intake line 14. By way of example, the speed responsive regulator or governor can be of the type illustrated on page 1303 of Marks' Mechanical Engineers' Handbook, fifth edition.

The system illustrated can also be used in connection with a drilling platform 10 fixed to the floor of the ocean through use of supporting legs (not shown), the cylinder 20, reservoir 12, hydraulic turbine 11 and electric generator 18, and all of the equipment associated therewith, being supported by or on the platform. Thus, the cylinder 20 will be stationary. However, the piston 21 and piston rod 22 will be caused to reciprocate in the cylinder by being secured to a float, such as the float 24, which is disposed at the surface of the water, being partially immersed therein. The float will move up and down under the action of the waves and shaft the piston rod 22 and piston 21 with it in the cylinder 20, the float being guided in its vertical movement by suitable guides depending from the drilling platform, in essentially the same manner as the guides 27 depend from the floating vessel 10 in the present drawings. The float will have substantial weight and buoyancy so as to exert a very large force on the piston 21, capable of moving large volumes of water from the cylinder 20 through a substantial height to the water storage reservoir 12.

It is, accordingly, apparent that a power generating system has been provided which utilizes the large amount of energy available in a large and heavy floating structure for pumping large quantities of water to a water storage reservoir, all under the action of the ocean waves. Such water is employed for rotating a hydraulic turbine connected to a suitable load, such as an electric generator, for the purpose of generating power at no expenditure of fuel. Accordingly, the power derived from the hydraulic turbine need not be supplied by the usual power generating mechanisms found on floating drilling barges or drilling platforms, resulting in substantial reduction in fuel consumption and cost.

I claim:

1. In a wave-driven power generating system: a platform member; a float member; means connecting said platform member and float member for limited relative vertical movement therebetween; means for securing one of said members to the floor of a body of water in substantially stationary position, whereby surface waves cause said other of said members to rise and fall in a generally vertical reciprocating motion relative to said one of said members; a reservoir carried by one of said members; a pump operated by said other of said members and responsive to the rise and fall of said other of said members for pumping water to said reservoir; a hydraulic motor; and means for directing water from said reservoir to said motor to operate the same.

2. In a wave-driven power generating system as defined in claim 1; wherein said float member is secured to the floor; said platform member being buoyant in water; said reservoir, pump, and hydraulic motor being carried by said platform member.

3. In a wave-driven power generating system as defined in claim 1; and an electrical generator coupled to and driven by said hydraulic motor.

4. In a wave-driven power generating system as defined in claim 2; and an electrical generator coupled to and driven by said hydraulic motor.

5. In a wave-driven power generating system as defined in claim 1; wherein said pump comprises a cylinder secured to one of said members and a piston secured to the other of said members, whereby relative reciprocation between said cylinder and piston pumps water to said reservoir.

6. In a wave-driven power generating system as defined in claim 2; wherein said pump comprises a cylinder secured to said platform member and a piston secured to said float member, whereby reciprocation of said cylinder along said piston pumps water to said reservoir.

7. In a wave-driven power generating system as defined in claim 1; and regulator means responsive to the speed of said hydraulic motor for controlling flow of water from said reservoir to said motor.

8. In a wave-driven power generation system as defined in claim 2; wherein said pump comprises a cylinder secured to said platform member and a piston secured to said float member, whereby reciprocation of said cylinder along said piston pumps water to said reservoir; and regulator means responsive to the speed of said hydraulic motor for controlling flow of water from said reservoir to said motor.

9. In a wave-driven power generating system as defined in claim 1; wherein said pump draws water from the body of water and pumps such water to said reservoir, and means for exhausting water from said motor to the body of water.

10. In a wave-driven power generating system as defined in claim 5; wherein suction line branches lead to opposite ends of said cylinder, discharge line branches leading from opposite ends of said cylinder and communicating with said reservoir, inlet check valves at said suction line branches, and discharge check valves at said discharge line branches, whereby said cylinder and piston are operative to pump water to said reservoir during both directions of relative reciprocation between said cylinder and piston.

11. In a wave-driven power generating system as defined in claim 6; wherein suction line branches lead to opposite ends of said cylinder, discharge line branches leading from opposite ends of said cylinder and communicating with said reservoir, inlet check valves at said suction line branches, and discharge check valves at said discharge line branches, whereby said cylinder and piston are operative to pump water to said reservoir during both directions of reciprocation of said cylinder along said piston.

References Cited

UNITED STATES PATENTS

| 657,355 | 9/1900 | Nagler | 253—9 |
| 793,497 | 6/1905 | Ariztia | 103—66 |
| 988,508 | 4/1911 | Reynolds | 290—53 XR |
| 2,179,537 | 11/1939 | Zoppa | 290—42 |
| 2,871,790 | 2/1959 | Weills | 290—42 XR |
| 3,289,592 | 12/1966 | Franzreb | 253—5 |
| 3,307,827 | 3/1967 | Silvers et al. | 103—64 XR |

FOREIGN PATENTS

| 801,984 | 9/1958 | Great Britain. |
| 872,125 | 1/1942 | France. |

ORIS L. RADER, Primary Examiner

G. R. SIMMONS, Assistant Examiner

U.S. Cl. X.R.

230—61, 67; 253—5, 10; 290—53